(12) United States Patent
Klett et al.

(10) Patent No.: US 7,147,214 B2
(45) Date of Patent: Dec. 12, 2006

(54) HUMIDIFIER FOR FUEL CELL USING HIGH CONDUCTIVITY CARBON FOAM

(75) Inventors: James W. Klett, Knoxville, TN (US); David P. Stinton, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 630 days.

(21) Appl. No.: 10/389,379

(22) Filed: Mar. 14, 2003

(65) Prior Publication Data

US 2003/0175201 A1 Sep. 18, 2003

Related U.S. Application Data

(63) Continuation-in-part of application No. 09/519,559, filed on Mar. 6, 2000, now Pat. No. 6,673,328, and a continuation-in-part of application No. 09/489,805, filed on Jan. 24, 2000, now abandoned.

(51) Int. Cl.
*B01D 1/00* (2006.01)
(52) U.S. Cl. .................................. 261/108; 165/104.15
(58) Field of Classification Search ........... 165/104.15; 261/108
See application file for complete search history.

(56) References Cited

U.S. PATENT DOCUMENTS

| | | | |
|---|---|---|---|
| 2,401,797 A | 6/1946 | Rasmussen | 210/150.5 |
| 3,306,353 A | 2/1967 | Burne | 165/164 |
| 3,453,809 A | 7/1969 | Henderson | 55/369 |
| 3,558,276 A | 1/1971 | Otani et al. | 23/209.1 |
| 3,784,487 A | 1/1974 | Franck et al. | 260/2.5 F |
| 3,914,392 A | 10/1975 | Klett | 264/29 |
| 3,973,975 A | 8/1976 | Deschamps | 228/183 |
| 3,979,196 A | 9/1976 | Frank et al. | 65/25 |
| 4,005,183 A | 1/1977 | Singer | 423/447.2 |
| 4,007,324 A | 2/1977 | Wallouch | 13/18 |
| 4,025,689 A | 5/1977 | Kobayashi et al. | 428/402 |
| 4,057,101 A | 11/1977 | Ruka et al. | |
| 4,096,097 A | 6/1978 | Yan | 252/510 |
| 4,125,676 A | 11/1978 | Maricle et al. | 429/38 |
| 4,205,055 A | 5/1980 | Maire et al. | 423/445 |
| 4,225,463 A | 9/1980 | Unger et al. | 252/445 |
| 4,272,356 A | 6/1981 | Stiller et al. | 208/8 LE |
| 4,276,246 A | 6/1981 | Bonzom et al. | 264/53 |
| 4,303,431 A | 12/1981 | Torobin | 65/21.4 |
| 4,311,682 A | 1/1982 | Miyazaki et al. | 426/448 |
| 4,318,824 A | 3/1982 | Turner | 252/421 |
| 4,408,659 A | 10/1983 | Hermanns et al. | |
| 4,439,349 A | 3/1984 | Everett et al. | 502/180 |
| 4,442,165 A | 4/1984 | Gebhardt et al. | 428/307.7 |
| 4,487,687 A | 12/1984 | Simo et al. | 208/56 |
| 4,512,388 A | 4/1985 | Clear et al. | 165/1 |
| 4,518,483 A | 5/1985 | Dickakan | 208/44 |
| 4,525,492 A | 6/1985 | Rastall et al. | 451/181 |
| 4,550,015 A | 10/1985 | Korb et al. | 423/445 |
| 4,572,864 A | 2/1986 | Benson et al. | 428/305.5 |
| 4,605,595 A | 8/1986 | Tsang et al. | 428/413 |
| RE32,319 E | 12/1986 | Korb et al. | 423/445 |
| 4,637,906 A | 1/1987 | Fukuda et al. | 462/29.1 |
| 4,659,624 A | 4/1987 | Yeager et al. | 428/408 |
| 4,775,655 A | 10/1988 | Edwards et al. | 502/416 |
| 4,782,586 A | 11/1988 | Joo et al. | 29/623.5 |
| 4,806,290 A | 2/1989 | Hopper et al. | |
| 4,832,881 A | 5/1989 | Arnold, Jr. et al. | 264/29.7 |
| 4,873,071 A | 10/1989 | Yamada et al. | 423/448 |
| 4,873,218 A | 10/1989 | Pekela | 502/418 |
| 4,892,783 A | 1/1990 | Brazel | 428/282 |
| 4,917,835 A | 4/1990 | Lear et al. | 264/29.1 |
| 4,934,657 A | 6/1990 | Dodson | 251/214 |
| 4,978,649 A | 12/1990 | Surovikin et al. | 502/416 |
| 4,992,254 A | 2/1991 | Kong | 423/449 |
| 4,999,385 A | 3/1991 | McCullough, Jr. et al. | 521/149 |
| 5,019,164 A | 5/1991 | Tomita et al. | 106/22 |
| 5,047,225 A | 9/1991 | Kong | 423/447.2 |
| 5,053,148 A | 10/1991 | Von Bonin | 252/8.05 |
| 5,071,631 A | 12/1991 | Takabatake | 423/445 |
| 5,076,845 A | 12/1991 | Seo et al. | 106/284.4 |
| 5,114,635 A | 5/1992 | Sohda et al. | 264/29.2 |
| 5,138,832 A | 8/1992 | Pande | 60/203.1 |
| 5,217,701 A | 6/1993 | Sakata et al. | 423/447.1 |
| 5,232,772 A | 8/1993 | Kong | 428/312.2 |
| 5,248,705 A | 9/1993 | McGuigan et al. | 521/149 |
| 5,300,272 A | 4/1994 | Simandi et al. | 423/445 R |

(Continued)

FOREIGN PATENT DOCUMENTS

FR 2411811 12/1977

(Continued)

OTHER PUBLICATIONS

Klett, J. and Edie, D., "Flexible Towpreg for the Fabrication of High Thermal Conductivity Carbon/Carbon Composites", *Carbon*, 33:10, pp. 1485-1503.

(Continued)

*Primary Examiner*—Stuart Hendrickson
(74) *Attorney, Agent, or Firm*—Kirk A. Wilson

(57) ABSTRACT

A method and apparatus of supplying humid air to a fuel cell is disclosed. The extremely high thermal conductivity of some graphite foams lends itself to enhance significantly the ability to humidify supply air for a fuel cell. By utilizing a high conductivity pitch-derived graphite foam, thermal conductivity being as high as 187 W/m·K, the heat from the heat source is more efficiently transferred to the water for evaporation, thus the system does not cool significantly due to the evaporation of the water and, consequently, the air reaches a higher humidity ratio.

5 Claims, 8 Drawing Sheets

U.S. PATENT DOCUMENTS

| | | | |
|---|---|---|---|
| 5,384,193 A | 1/1995 | Suh et al. ............... | 428/375 |
| 5,437,927 A | 8/1995 | Ross et al. .............. | 428/367 |
| 5,451,825 A | 9/1995 | Strohm | |
| 5,481,149 A | 1/1996 | Kambe et al. | |
| 5,487,946 A | 1/1996 | McGinniss et al. ...... | 428/413 |
| 5,530,309 A | 6/1996 | Weldon | |
| 5,540,903 A | 7/1996 | Romine ............... | 423/445 R |
| 5,556,892 A | 9/1996 | Pekala ................... | 521/181 |
| 5,578,255 A | 11/1996 | Okuyama et al. ........ | 264/29.5 |
| 5,580,500 A | 12/1996 | Muramatsu et al. ...... | 264/29.1 |
| 5,582,781 A | 12/1996 | Hayward ............... | 264/28 |
| 5,587,618 A | 12/1996 | Hathaway | |
| 5,614,134 A | 3/1997 | Sohda et al. ............ | 264/29.1 |
| 5,695,816 A | 12/1997 | Iwashita et al. ......... | 427/228 |
| 5,705,106 A | 1/1998 | Kolesnikov et al. ...... | 264/29.1 |
| 5,709,914 A | 1/1998 | Hayes .................. | 428/35.1 |
| 5,733,484 A | 3/1998 | Uchida et al. .......... | 264/29.1 |
| 5,770,127 A | 6/1998 | Abrams et al. .......... | 264/29.1 |
| 5,783,879 A | 7/1998 | Furlani et al. | |
| 5,821,659 A | 10/1998 | Smith | |
| 5,822,839 A | 10/1998 | Ghosh et al. | |
| 5,868,974 A | 2/1999 | Kearns ................ | 264/29.6 |
| 5,882,621 A | 3/1999 | Doddapaneni et al. ...... | 423/445 |
| 5,888,430 A | 3/1999 | Wakayama et al. ........ | 252/503 |
| 5,888,469 A | 3/1999 | Stiller et al. ........... | 423/445 R |
| 5,902,562 A | 5/1999 | Lagasse et al. .......... | 423/445 |
| 5,945,084 A | 8/1999 | Droege ................ | 423/447.4 |
| 5,954,937 A | 9/1999 | Farmer .................. | 205/687 |
| 6,013,371 A | 1/2000 | Hager et al. ............ | 428/408 |
| 6,033,506 A | 3/2000 | Klett ..................... | 156/78 |
| 6,037,032 A | 3/2000 | Klett et al. ............. | 428/71 |
| 6,051,905 A | 4/2000 | Clark | |
| 6,074,888 A | 6/2000 | Tran et al. | |
| 6,077,464 A | 6/2000 | Murdie et al. | |
| 6,103,149 A | 8/2000 | Stankiewicz | |
| 6,126,874 A | 10/2000 | Dillon et al. ........... | 264/29.7 |
| 6,142,222 A | 11/2000 | Kang et al. ............. | 165/148 |
| 6,537,351 B1* | 3/2003 | Margiott et al. ......... | 95/273 |
| 6,744,270 B1* | 6/2004 | Stone ................... | 324/760 |

FOREIGN PATENT DOCUMENTS

| | | |
|---|---|---|
| JP | 408048509 A | 2/1996 |
| WO | WO 95/08210 | 3/1995 |
| WO | WO 9827023 | 6/1998 |
| WO | WO 99 64223 | 1/1999 |
| WO | WO 99 11585 | 3/1999 |
| WO | WO 99 11586 | 3/1999 |

OTHER PUBLICATIONS

Edie, D.D., "Pitch and Mesophase Fibers", pp. 1-30 (1990) (from *Carbon Fibers and Filmaments* J.L. Figueiredo, Ed., Kluwer Academic Publishers).

Klett, J., "High Thermal Conductivity, Mesophase Pitch-Derived Carbon Foam," Proceedings of the 1998 43rd Int'l SAMPE Symposium and Exhibition, Part 1 of 2, Anaheim, CA, 43:1, pp. 745-755 (May 31-Jun. 4, 1998).

Anderson, H.J. Anderson, D.P., Kearns, K.M., "Microcellular Pitch-Based Carbon Foams Blown with Helium Gas," Proceedings of the 1998 43rd Int'l SAMPE Symposium and Exhibition, Part 1 of 2, Anaheim, CA, 43:1, pp. 745-755 (May 31-Jun. 4, 1998).

Klett, J.W., Burchell, T.D., "High Thermal Conductivity, Mesophase Pitch Derived Carbon Foam," *Science and Technology of Carbon*, Extended Abstracts and Programme, Eurocarbon, vol. II, Strasbourg, France (Jul. 5-9, 1998).

Klett, J.W., Walls, C., Burchell, T., "High Thermal Conductivity Mesophase Ptich Derived Carbon Foams: Effect of Precursor on Structure and Properties," Carbon '99, 24th Biennial Conference on Carbon (Jul. 11-16, 1999).

Klett, J.W., "High Thermal Conductivity, Mesophase Pitch-Derived Graphic Foams," *J. Composites in Mfg.*, 15:4, pp. 1-7.

"Poco Graphie Foam Update 1," pages published at the website of Poco Graphite, Inc., of Decatur, Texas at >>poco.com/pocofoam/grafpod.com>> as downloaded on Jan. 21, 2000.

Hexcel Product Data Sheet (1997).

Kearns, K., Graphitic Carbon Foam Processing, 21st Annual Conference on Composites, Materials and Structures, Jan. 26-31, 1997, Cocoa Beach, FL pp. 835-847 (1997).

Lake, M.L., "Simple Process Produces High Modulus Carbon Fibers at Much Lower Cost, "*Mat. Tech.* 11(4):137-139 (1996).

Jones, S.P., Fian, C.C. and Edie, D.D., "Structural Development in Mosephase Pitch Based Carbon Fibers Produced from Naphthalene," 35(10): 1533-1543 (1997).

Amoco Product Literature (1997).

Steiner, K.V., et al., "Production and Properties of Ultra-Lightweight Aluminum Foams for Industrial Applications," Proceeding from the 4th International Conference on Composites Engineering, Edited by David Hui, pp. 943-944 (1997).

Inoue, K., "Application of Laser Flash Method to Penetrative Materials for Measurement of Thermal Diffusivity," *High Temp. Tech.* 8(1): 21-26 (1990).

Ohlorst, C.W. et al., "Thermal Conductivity Database of Various Structural Carbon-Carbon Composite Materials," NASA Technical Memorandum 4787 (Nov. 1997).

Mehta, R. et al., "Graphic Carbon Foams: Processing and Characterization," 21st Bieneial Conference on Carbon, Conf. Proceedings, American Carbon Society, Buffalo, NY, pp. 104-105 (1993).

Cowan, R.D., "Pulse Method of Measuring Thermal Diffusivity at High Temperatures," J. of App. Phys., 34(4), pp. 926-927 (1962).

*Introduction to Carbon Science*, ed. Harry Marsh, Butterworths and Co., Ltd., London, pp. 6-16, 39-44, 47-49, 51-52, 55-58, 61 and 109 (1989).

Brooks and Taylor, "The Formation of Graphitizing Carbons from the Liquid Phase," *Carbon*, 3(2), pp. 185-193 (1965).

Rouzaud, J.N. and Oberlin, A., "Structure, Microtexture and Optical Properties of Anthracene and Saccharose-Based Carbons," *Carbon*, 27(4), pp. 517-519 (1989).

Rand, B., "Matrix Precursors for Carbon-Carbon Composites," in *Essentials in Carbon-Carbon Composites*, edited by C.R. Thomas, Royal Society of Chemistry, London pp. 67-102 (1993).

Kelly, B.T., "The Thermal Conductivity of Graphite," *Physics and Chemistry of Carbon*, 5, pp. 119-215 (1969).

Adams, P.M., Katzman, H.A. and Rellick, G.S., "Microstructural and X-Ray Diffraction Studies of Carbon/arbon Composites for Thermal Management Applications," Aerospace Report No. ATR-98-(8565)-1, Naval Surface Warfare Center Carderock Division, Contract No. F04701-93-C-0094, Mar. 1, 1998.

Ultramet Product Literature, 1998 (for Ultrafoam$_c$).

Japan Patent Publication No. 04163319, Published Jun. 8, 1992 (one page English abstract from European Patent Office).

Klett, J. and Edie, D., "Flexible Towpreg for the Fabrication of High Therman Conductivity Carbon/Carbon Composites," URL:http://ww.ms.ornl.gov.cimtech/cfcms/towpreg.html. Last updated Apr. 14, 1996.

XP-002080696—Patent Abstracts of Japan, vol. 014, No. 386 (C-0750), Aug. 21, 1990 and JP 02 142891 A (Kawasaki Steel Corp.), May 31, 1990.

Shih, Wei, "Development of Carbon-Carbon Composites for Electronic Thermal Management Applications,"IDA Workshop, May 3-5, 1994, pp. III-119-III-136.

Engle, G.B., A.R. Phillips Laboratory Contract No. F29601-93-C-0165, "High Thermal Conductivity C/C Composites for Thermal Management," IDA Workshop, May 3-5, 1994, pp. III-137-III-148.

Hager, Joseph W. and Lake, Max L., "Novel Hybrid Composites Based on Carbon Foams, " Mat. Res. Soc. Symp., Materials Research Society, 270:29-34 (1992).

Sandhu, S.S. and Hager, J.W., "Formulation of Mathematical Process Model for the Foaming of a Mesophase Carbon Precursor," Mat. Res. Soc. Symp., Materials Research Society, 270:35-40 (1992).

Gibson, L.J. and Ashby, M.F., "Cellular Solids: Structure & Properties," pp. 1-277, Pergamon Press, New York (1988).

Gibson, J.J., "Modeling the Mechanical Behavior of Cellular Materials," Mat. Sci. and Eng. A110, pp. 1-36 (1989).

Knippenberg, W.F. and Lersmacher, B., "Carbon Foam," Phillips Tech. Rev. 36, pp. 93-103 (1976), No. 4.

White, J.L. and Sheaffer, P.M., "Pitch-Based Processing of Carbon-Carbon Composites," Carbon, 27: pp. 697-707 (1989).

Hager, Joseph W., "Idealized Strut Geometrics for Open-Celled Foams," Mat. Res. Sco. Symp., Materials Research Society, 270:41-46 (1992).

Aubert, J.H., MRS Symposium Proceedings, "Microcellular Foams Prepared from Demixed Polymer Solutions," 207:117-127 (1991).

Cowland, F.C. and Lewis, J.C., "Vitreous Carbon-A New Foam of Carbon," J. of Mat. Sci. 2:507-512 (1967).

Noda, T., Inagaki, M. and Yamada, S. "Glass-Like Carbons," J. of Non-Crystalline Solids, 1:285-302 (1969).

Davies, G.J. and Zhen, Shu "Review: Metallic Foams: Their Production, Properties and Applications," J. of Mat. Sci. 18: pp. 1899-1911 (1983).

Hager, J., et al., "Idealized Ligament Formation and Geometry in Open-Celled Foams," 21st Bienniel Conf. on Carbon Extended Abstracts, p. 102 (1993).

Hager, J., et al., "Progress in Open-Celled Carbon Foams, "40th International Sampe Symposium, Anaheim, CA (May 8-11, 1995).

* cited by examiner

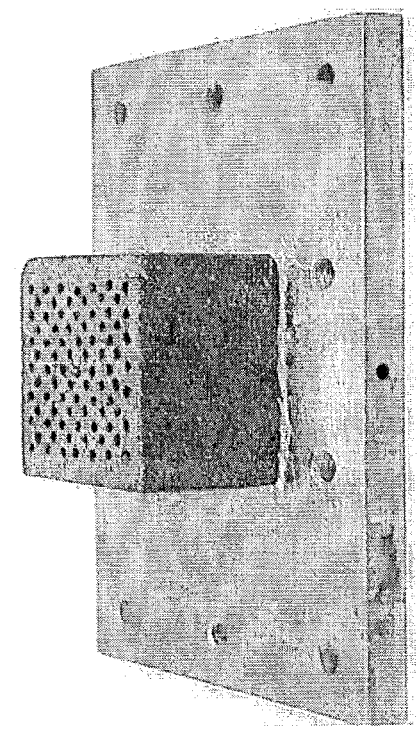
Fig. 2B
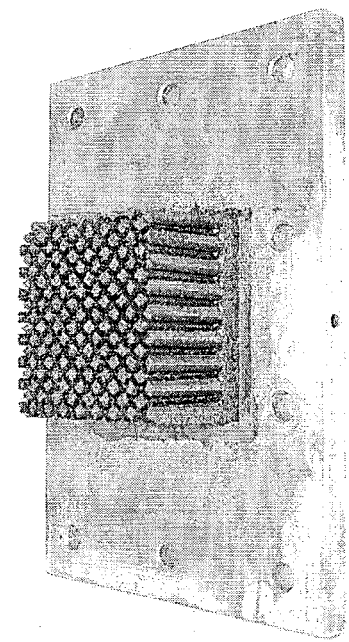
Fig. 2D
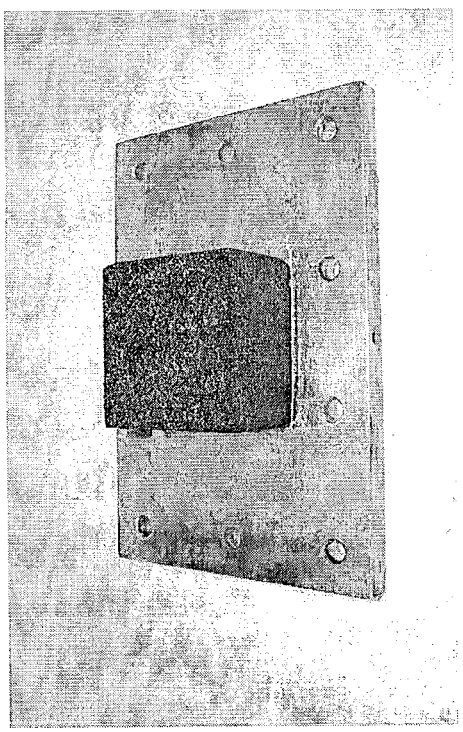
Fig. 2A
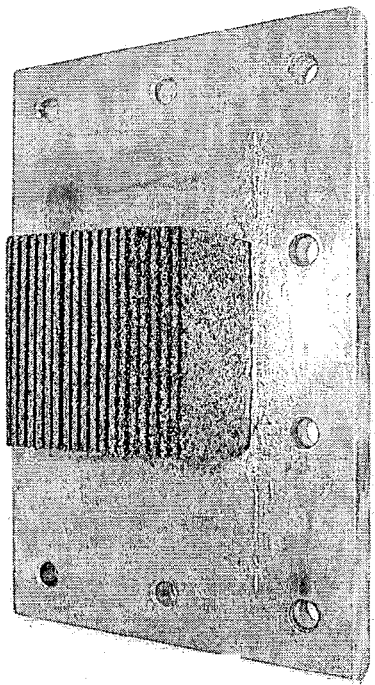
Fig. 2C
Fig. 2

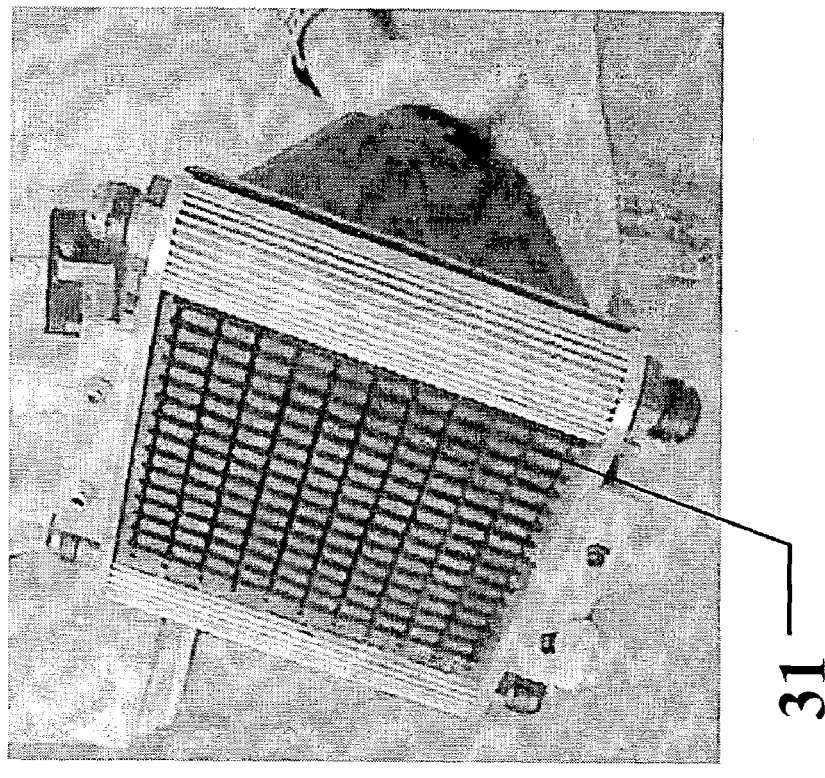
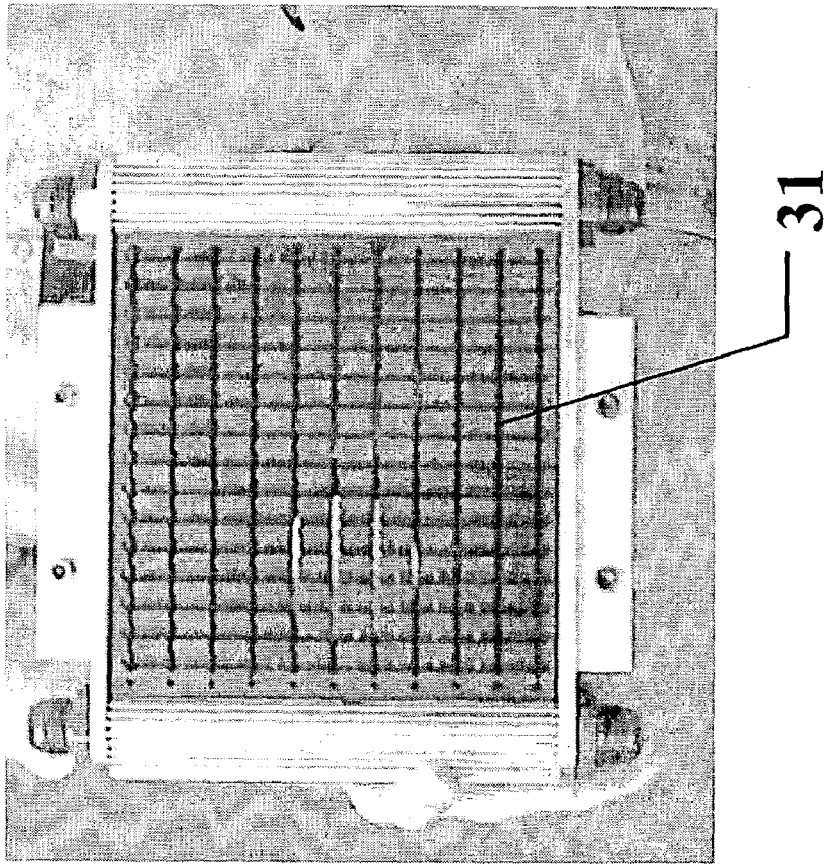
Fig. 4

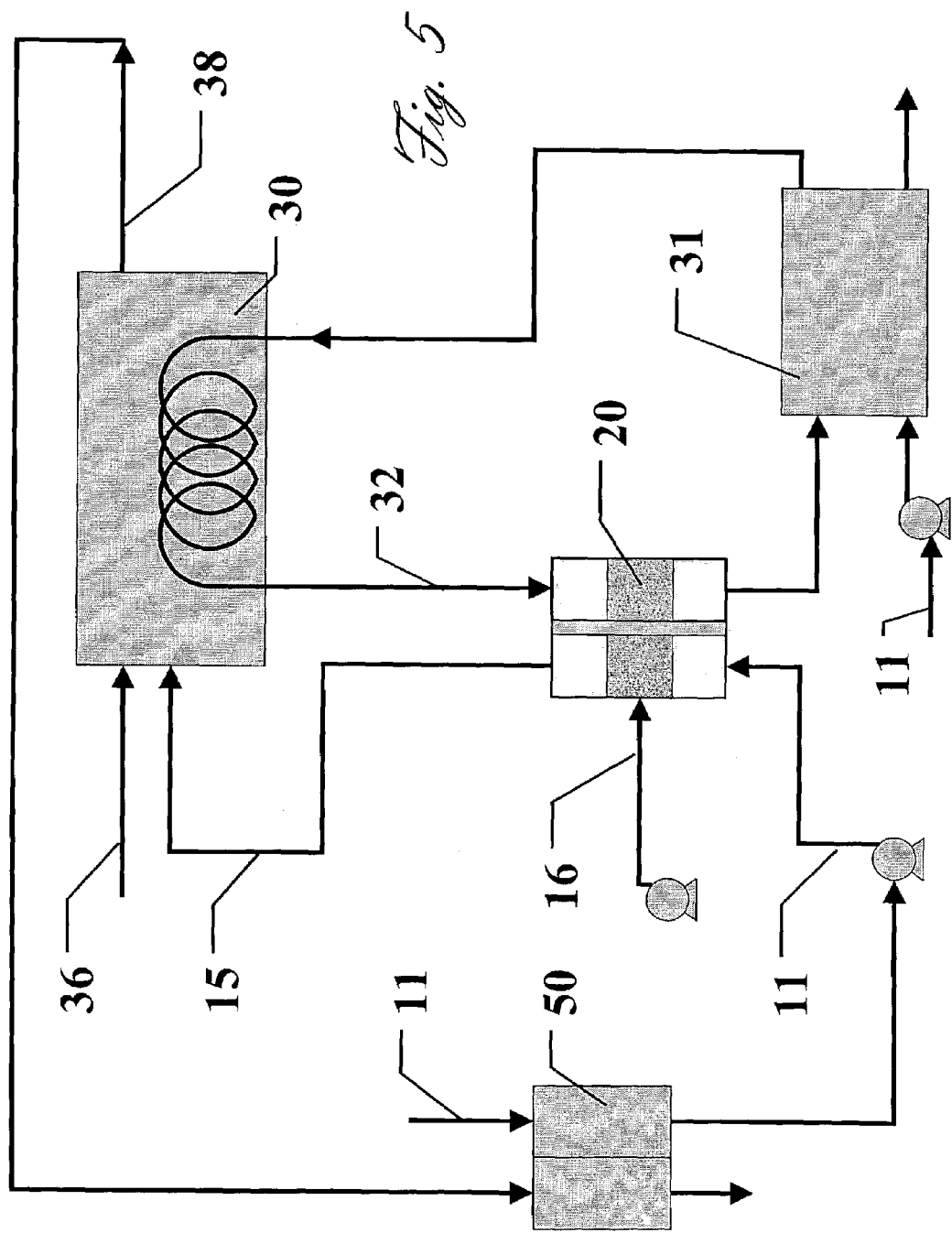

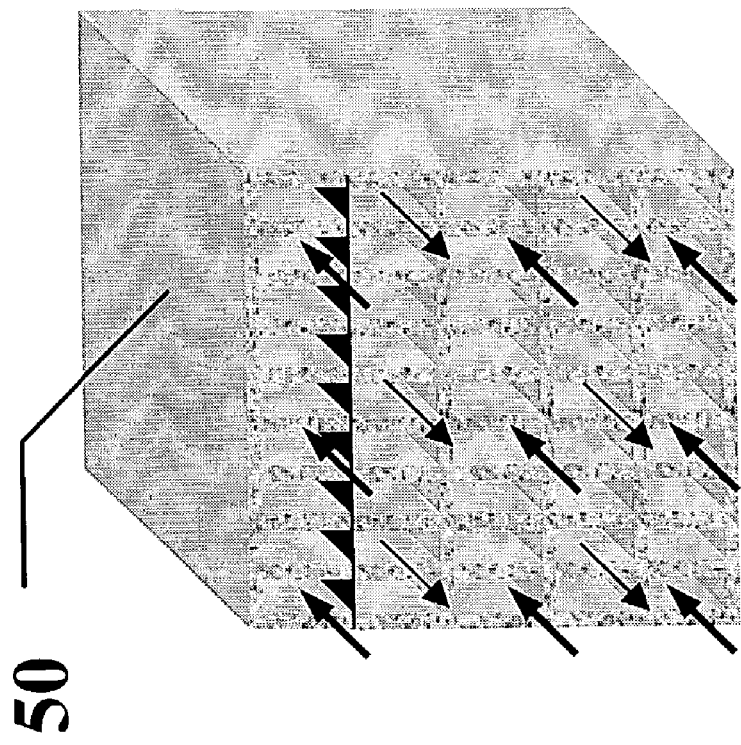
Fig. 6B
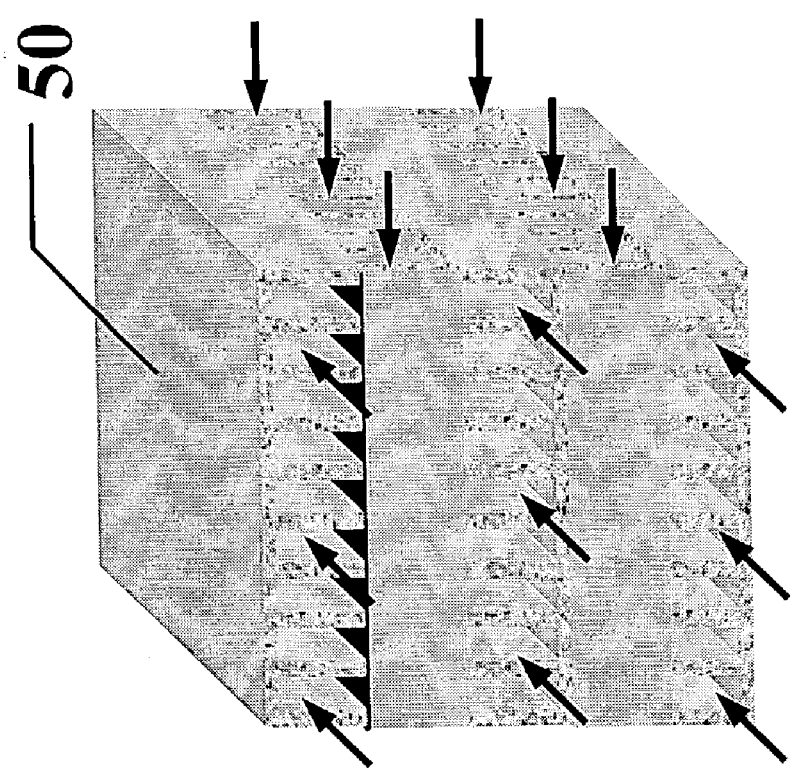
Fig. 6A
Fig. 6

HUMIDIFIER FOR FUEL CELL USING HIGH CONDUCTIVITY CARBON FOAM

CROSS-REFERENCE TO RELATED APPLICATIONS

This application is a continuation-in-part of earlier filed U.S. patent applications Ser. No. 09/489,805 filed on Jan. 24, 2000 now abandoned and 09/519,559 filed on Mar. 6, 2000 now U.S. Pat, No. 6,673,328, both herein incorporated by reference in their entirety.

STATEMENT REGARDING FEDERALLY SPONSORED RESEARCH

The United States Government has rights in this invention pursuant to contract DE-AC05-00OR22725 between the United States Department of Energy and UT-Battelle, LLC.

BACKGROUND OF THE INVENTION

The present invention generally relates to pretreatment of fuel cell feed airstreams and specifically to a device and method for humidifying an airstream to a fuel cell using porous carbon foam.

Conventional methods for humidifying air involve spraying water over a high surface area medium (cloth, steel wool, etc) and forcing the dry supply air over the moist medium, which results in evaporation of the water from the surfaces of the medium, thereby producing humid air suitable for the supply of a fuel cell. However, the drawbacks to these conventional methods are that the evaporation of the water from the evaporating medium produces an endothermic effect and the medium chills dramatically, albeit very slowly due to its low conductivity. The results of this cooling effect is that the supply air cools and reduces the saturation point of the air (which results in a lower humidity content once the air is heated going into the fuel cell) and the cooled evaporating medium and water present then have a lower thermodynamic driving force to evaporate. Attempts to overcome this by heating the evaporative medium have been unsuccessful since the traditional evaporative mediums exhibit low thermal conductivities, which result in high losses and low efficiency of supplying the heat of vaporization to the water/medium. If the medium is a cheap steel wool or cloth fabric, the thermal conductivity can be as low as 1 watt per meter per degree Kelvin (W/m·K). If the medium is an expensive aluminum or copper foam (which is not the traditional choice), the thermal conductivities are not much better at about 10–20 W/m·K. Conversely, by utilizing a high conductivity graphite foam, the thermal conductivity can be as high as 187 W/m·K. This order of magnitude higher conductivity results in more heat being applied to the water for evaporation from the heat source, thus the system doesn't cool and the air reaches a higher content of humidity.

SUMMARY OF THE INVENTION

The unique properties of graphitic foam used in the humidifier of this invention are derived from the fact that the foam is not stabilized during the carbonization cycle, unlike all prior mesophase pitch foams. This allows extremely large ligament thermal conductivities, greater than 1700 W/m·K. This translates to a thermal conductivity in the bulk material up to 187 W/m·K at densities around 0.6 g/cm$^3$. This extraordinary thermal conductivity, combined with its open surface area of more than $2 \times 10^6$ m$^2$/m$^3$, yield a material which is uniquely suited for heat and moisture transfer.

This invention overcomes the problems associated with traditional humidification techniques by utilizing the graphite foam to act as both a water management material as well as a heat management device. By using the high conductivity of the foam ligaments, the foam can efficiently transfer heat from a hot source to the water on the surface of the ligaments to effect the evaporation and, thus humidification. More importantly, the advantage of significantly more surface area for this evaporation than traditional devices, will allow a smaller humidifier as well as the ability to capture waste heat to drive the humidification.

The invention comprises a method and apparatus of supplying humidified air to a device or process. The extremely high thermal conductivity of some graphite foams lends itself to enhance significantly the ability to humidify supply air for a fuel cell. By utilizing a high conductivity graphite foam, thermal conductivity being as high as 187 W/m·K, the heat from the heat source is more efficiently transferred to the water for evaporation, thus the system does not cool due to the evaporation of the water and, consequently, the air reaches a higher humidity ratio.

The humidifier comprises a first pitch-derived graphitic carbon foam element, a means for heating said first foam element, a means for wetting said first foam element, and a means for increasing the humidity ratio of an airstream passed through said first foam element.

BRIEF DESCRIPTION OF THE DRAWINGS

FIGS. 2A through 2D are photographs of various finned carbon foam element structures.

FIG. 4 shows two photographs of a carbon foam radiator used in one embodiment of the invention.

FIG. 5 is a flow diagram of an invention embodiment using an inlet air preheater.

FIGS. 6A and 6B show two flow arrangements for the preheater.

DETAILED DESCRIPTION OF THE INVENTION

In the present invention, humidification is accomplished by the transferring of heat from a heat source such as fuel cell cooling water, a resistance heating device, power electronics, etc., through the foam ligaments to the moisture entrained on the surface of the foam. This heat is used to overcome the latent heat of vaporization of the water, and thus the system remains isothermal during operation (i.e. does not cool), or it heats. The high surface area of the foam enhances the evaporative effect in that a high surface area to volume of water can be deposited on the foam. The extreme high conductivity of the ligaments (greater than 5 times that of copper) ensures efficient transfer of heat from the source to the water and reduces losses.

Figure 1:
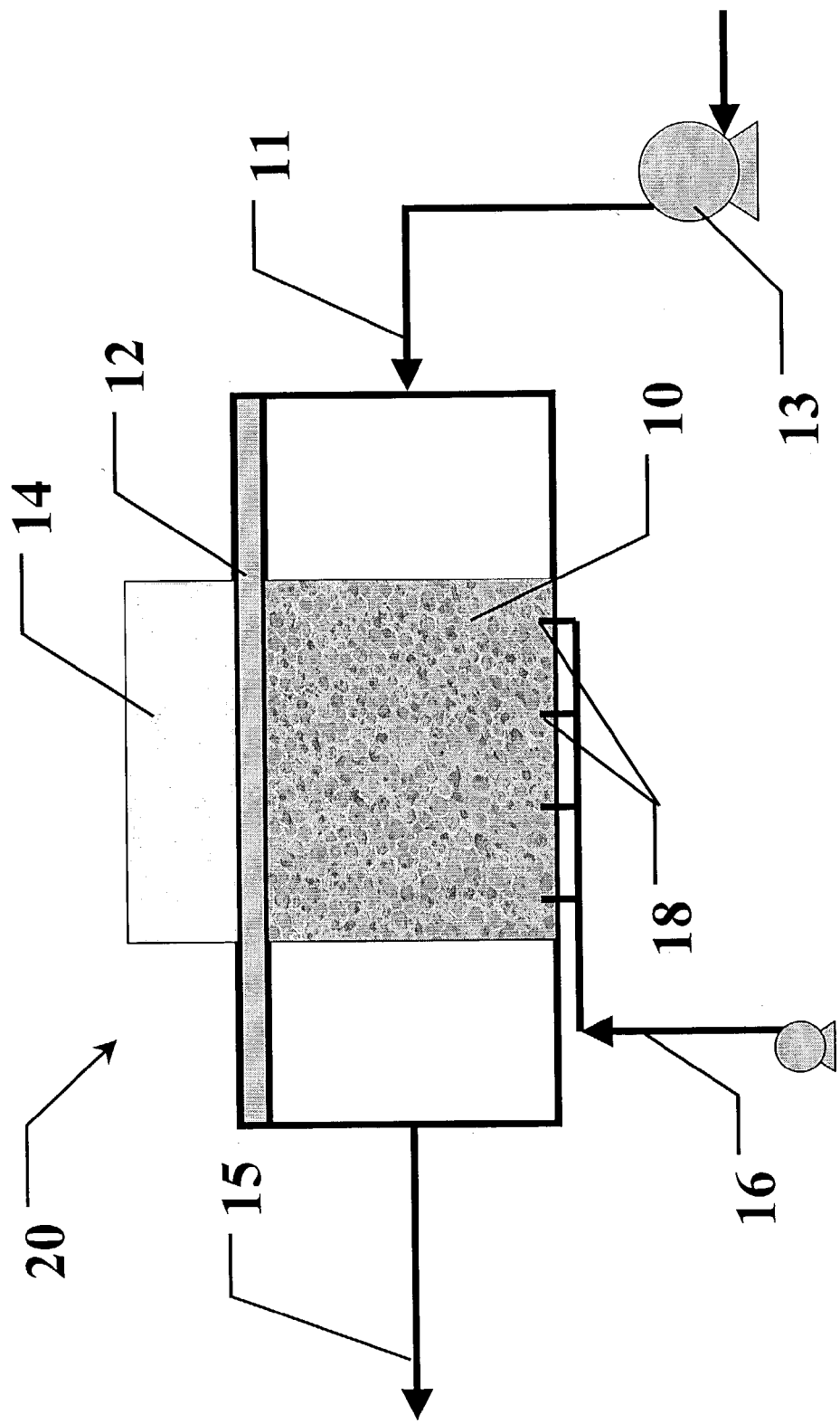
FIG. 1 is a flow diagram of an embodiment of the invention using power electronics as a heat source.

FIG. 1 illustrates the first embodiment of the humidifier 20 in the present invention. For illustrative purposes, the heat from the onboard power electronics 14 is used as the heat source. High conductivity graphite foam 10 is attached to the surface of the spreader plate 12 opposite the power electronics 14 heat source by some means of joining. This foam is ducted in some fashion such that air can be forced through the foam structure. A water supply system 16 is used to add water to the foam at 18. If the foam is properly surface treated (i.e. oxidation at 500° C. for more than 8 hours), the water will wick up through the pores of the foam and be then evaporated as the forced dry air 11 is passed through the foam. A blower/compressor 13 is used to bring in filtered ambient air and force it through the foam. As the air is forced through the foam, the heat from the heat source 14 heats it. Concurrently, the heat from the heat source combined with the now lower humidity level of the incoming air, result in evaporation of the water added to the system. The exiting air 15 is now both heated and closer to the desired humidity of the fuel cell inlet air. Preferably, the inlet air is heated prior to entering the humidifier, by such means as using the exhaust products of the fuel cell. This will result in a "dryer" air flowing over the moist foam, and in turn, result in more moisture being evaporated into the air stream.

The method of attaching the foam to the heat source is important, but not critical. The preferred method is brazing since it creates a strong thermally conductive interface, but other means such as epoxy are acceptable if the bondlines are thin (i.e. less then 1 mil=2.54 EE-05 meters). The thinner the bondline, the less important the thermal conductivity of the bond material is to the overall conductance of the system.

The foam is preferably machined such that it is a finned structure, more preferable the finned structure resembles a pin-fin structure as shown in FIG. 2D. However, configurations such as the solid block of FIG. 2A, vertical blind holes of FIG. 2B, and straight fins of FIG. 2C are possible. This pin-fin structure reduces the pressure drop through the foam, and therefore reduces the parasitic losses on the compressor/blower. In a solid foam structure, the pressure drop can be as high as 2 pounds per square inch (psi) per inch of thickness whereas in a finned structure in can be less than 0.05 inches water per inch of thickness. Therefore, a compressor would be required for the system with a solid foam and only a blower would be required for the system with the finned structure. It is obvious that there are many more means of reducing pressure drop by changing the design of the foam structure, and most will be suitable for this system.

It is important to note that in most fuel cells, a compressor will already be required to supply the filtered inlet air if ambient air is used, especially on an automobile, airplane, or ship. It is likely that since the pressure drop of this humidifier can be designed to be very low, the same compressor already in use or currently designed will be suitable. Therefore, this embodiment did not increase the parasitic losses of the fuel cell significantly, but increased its overall efficiency by increasing the humidity level of the inlet air.

It is also important to note that in portable fuel cells, like that in an automobile, it is generally understood that onboard supply of water will be required for the humidification of the ambient air. Therefore, the system of this invention has not required any extra water to be carried with the automobile. It is generally understood that you will have to fill up the water at the same time as you will fill up the fuel for the fuel cell.

Figure 3:
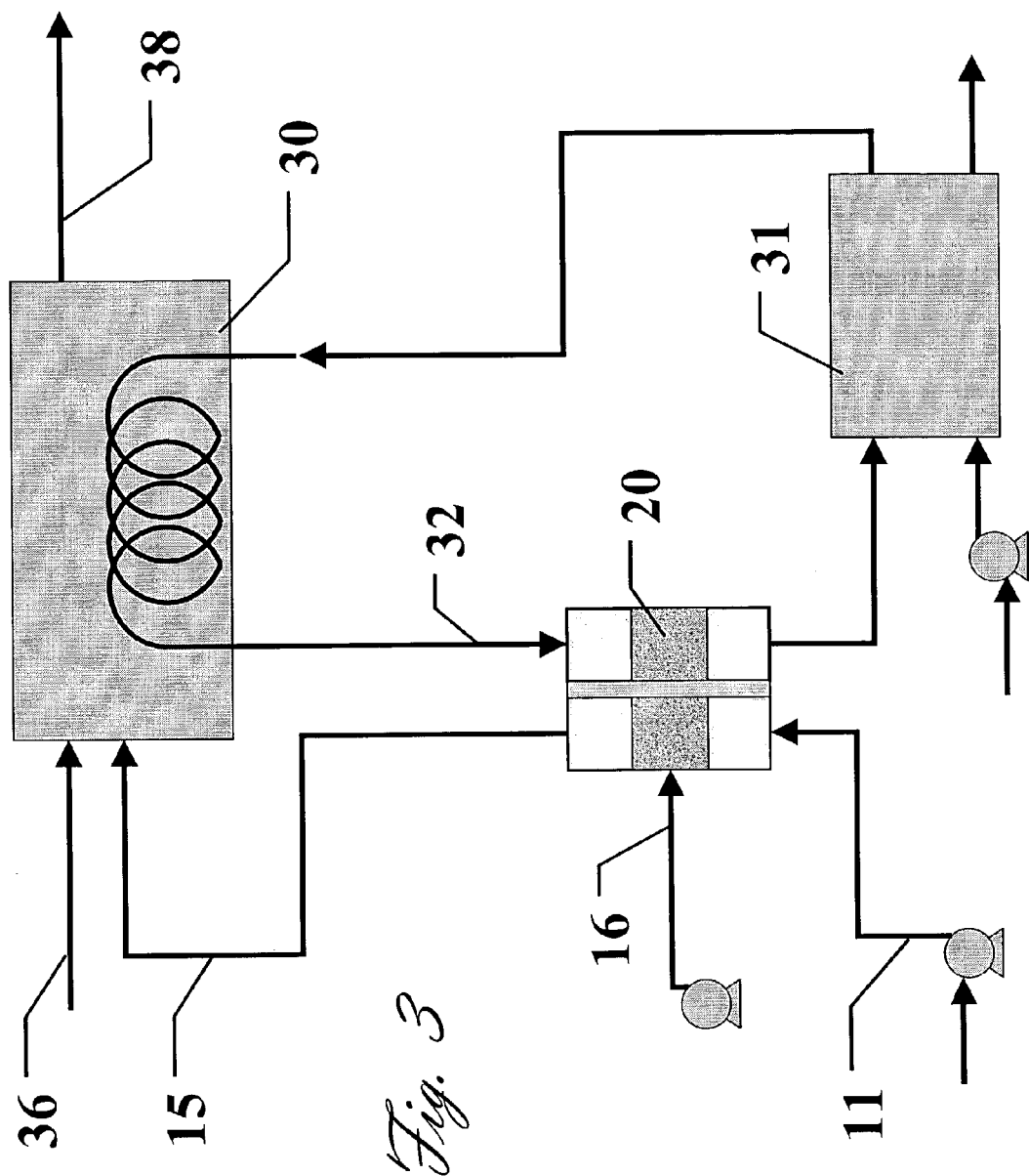
FIG. 3 is a flow diagram of an invention embodiment using fuel cell cooling water as a heat source.

In another embodiment of the present invention, a similar design is used, but in conjunction with the cooling water of the fuel cell and the radiator (which can be made from high conductivity carbon foam itself). FIG. 3 is a schematic of the second embodiment. This inlet air (considered dry ambient air) 11 is passed through a similar humidifier 20 as in FIG. 1, but with the heat source being the hot cooling fluid 32 exiting the fuel cell 30. The hot cooling fluid 32 supplies enough heat for the humidification process with a similar foam structure on the fluid side (i.e. pin-fin). Depending on the inlet air humidification needs (which is dependent on the ambient humidity), the fuel cell cooling fluid will still need to be cooled further by a radiator 31. The humid fuel cell inlet air 15 is then supplied to the fuel cell 30, as needed, along with optional additional fuel 36 to enable the fuel cell energy production before leaving the fuel cell as exhaust 38. Again, as in FIG. 1, the compressor already required for the inlet air will be sufficient to force the inlet air through the humidifier and the water supply 16 for the humidifier is already required. Therefore, there is no extra parasitic loss on the system, but waste heat from the fuel cell is recovered to improve it efficiency by increasing the humidity level, and hence extra power is not used to humidify the inlet air as in current systems.

In this embodiment, the fuel cell cooling fluid leaving the humidifier is then sent to a radiator 31 for further cooling. Preferably, this is a heat exchanger made with graphite foam as shown in FIG. 4. This heat exchanger exhibits heat transfer coefficients up to two orders of magnitude greater than existing radiators and therefore, the size of the system is about ⅕th that of the current systems. This also leads to smaller fans for forcing the air over the radiator and therefore reduces parasitic losses commonly associated with the cooling system.

In another embodiment, the inlet air to the humidifier is first heated by a preheater 50 using the exhaust of the fuel cell 30 as in FIG. 5, preferably using a carbon foam air-air heat exchanger as shown in FIG. 6. The preheater 50 can be either a crossflow arrangement of FIG. 6A or a counter-current flow of FIG. 6B. The hot inlet air is now "drier" and can accept more moisture, resulting in a higher humidity content in the inlet air to the fuel cell. This will result in even higher efficiencies.

Figure 7:
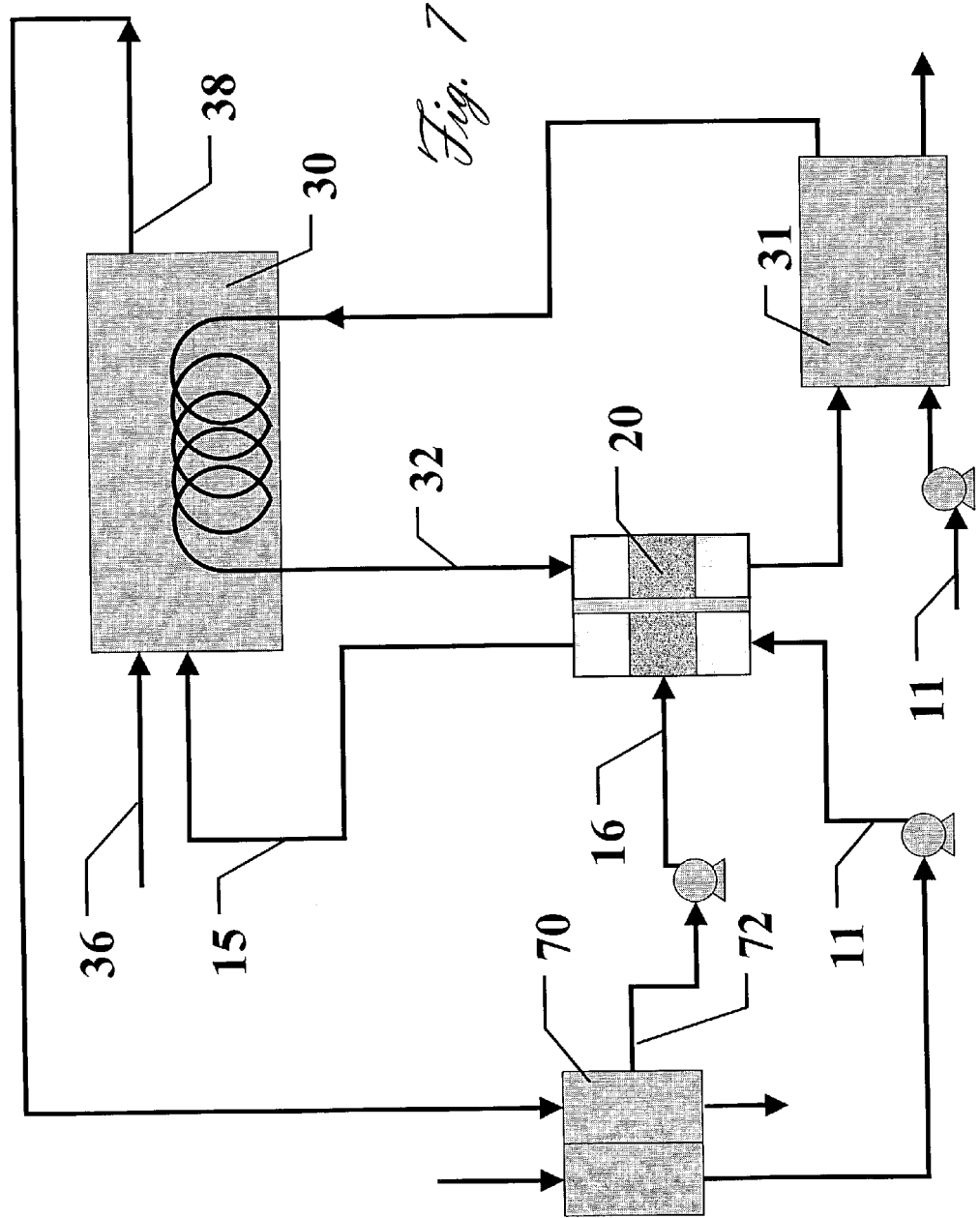
FIG. 7 is a flow diagram of an invention embodiment that recovers condensed moisture from the fuel cell exhaust in a condenser.

In yet another embodiment, the preheater 50 heat exchanger used to preheat the inlet air to the humidifier can double as a condenser 70 to condense moisture 72 entrained in the fuel cell exhaust gasses, as seen in FIG. 7. While a chilled condenser will be most efficient, cooling to ambient conditions should be enough to recapture a significant amount of the supplied water in the humidifier, thereby recycling most of the water and reducing losses. This also reduces the amount of water needed to be supplied to the vehicle at the time of fuel "fill-ups."

Figure 8:
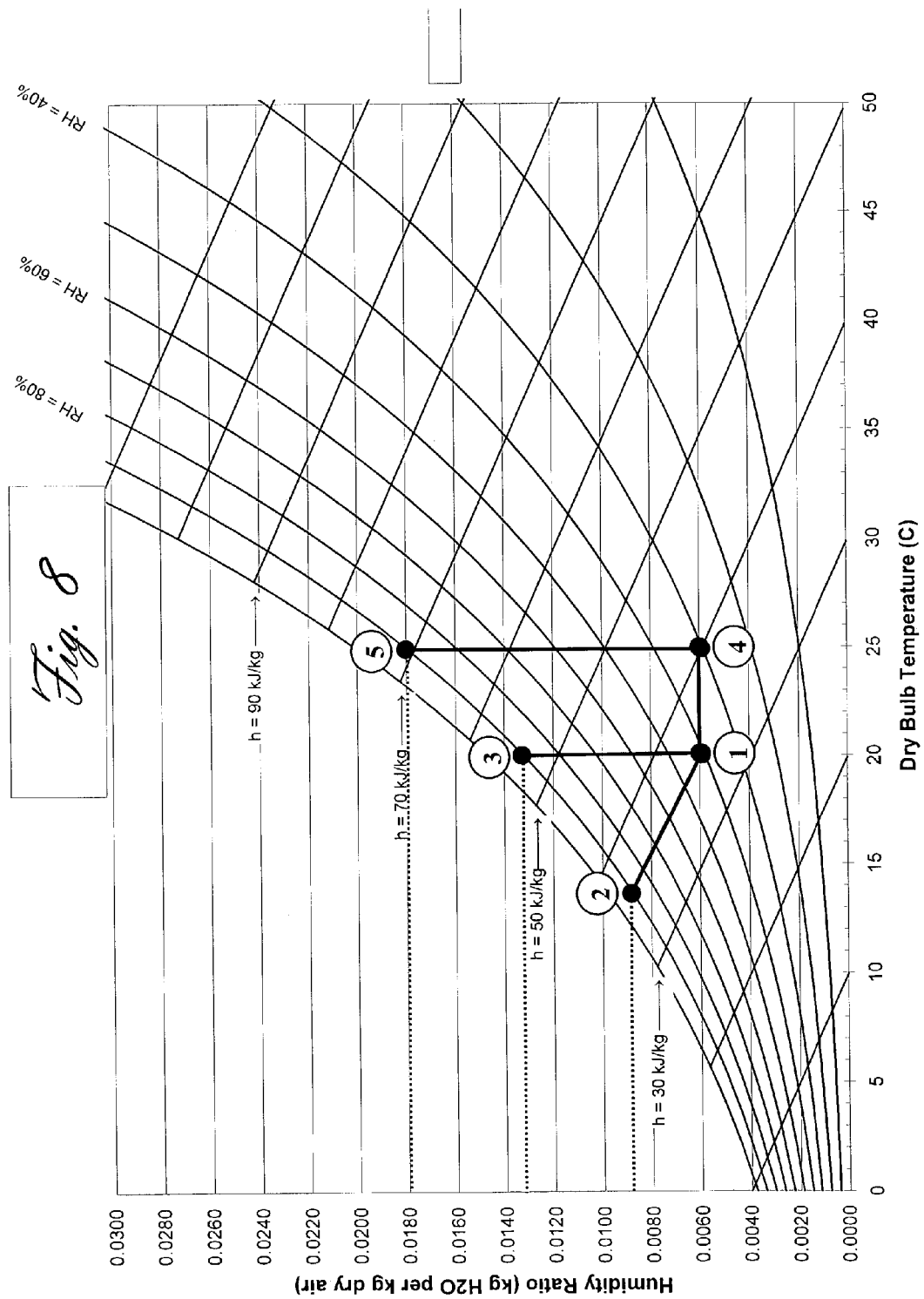
FIG. 8 is a psychrometric chart showing the thermodynamic properties of the air humidified by the embodiments of the invention.

FIG. 8 shows example psychrometrics of the supply air to the fuel cell. Under conventional un-heated adiabatic humidification, air enters the humidifier at 20° C. dry bulb, 0.0006 kg/kg dry air humidity ratio (state point 1) and leaves the humidifier at 13.5° C., 0.0009 kg/kg (state point 2). One embodiment of the instant invention in FIG. 3 provides a means for isothermal humidification wherein the air conditions leaving the humidifier are 20° C., 0.013 kg/kg (state point 3), thereby improving the moisture content (humidity ratio) and dry bulb temperature of the supply air for improved fuel cell performance. Another embodiment of the instant invention in FIGS. 5 and 7 preheats the supply air to 25° C. (state point 4) and then isothermally humidifies the air to 25° C., 0.018 kg/kg (state point 5), thereby further improving the moisture content of the supply air for greater fuel cell performance.

A unique feature is the use of the carbon foam to capture waste heat from onboard systems (such as cooling fluids and power electronics and exhaust gases) and utilize it efficiently (more than an order of magnitude better than metallic systems) to humidify the inlet air to a fuel cell. By having a more humid inlet air, the fuel cell experiences less drying of the proton exchange membrane (PEM) elements and therefore experiences a higher conversion of the fuel to electricity. This, and the fact that it is using waste heat, rather than electricity to power systems to humidify, results in a higher efficiency of the fuel cell and better fuel mileage.

There are many alternatives, but the general idea of capturing waste heat from the exhaust gases, cooling fluids, and power electronics is the same. The specific dimensions and geometries of the heat exchangers, methods of delivery of the water, and pumping systems may be different, but do not deviate from the intent of this invention.

Carbon foam used in the humidifier was examined with photomicrography, scanning electron microscopy (SEM), X-ray analysis, and mercury porisimetry. The interference patterns under cross-polarized light indicate that the struts of the foam are completely graphitic. That is, all of the pitch was converted to graphite and aligned along the axis of the struts. These struts are also similar in size and are interconnected throughout the foam. This would indicate that the foam would have high stiffness and good strength. The foam is open cellular meaning that the porosity is not closed. Mercury porisimetry tests indicate that the pore sizes are in the range of 90–200 microns.

A thermogravimetric study of the raw pitch was performed to determine the temperature at which the volatiles are evolved. The pitch loses nearly 20% of its mass fairly rapidly in the temperature range between about 420° C. and about 480° C. Although this was performed at atmospheric pressure, the addition of 1000 psi pressure will not shift this effect significantly. Therefore, while the pressure is at 1000 psi, gases rapidly evolved during heating through the temperature range of 420° C. to 480° C. The gases produce a foaming effect (like boiling) on the molten pitch. As the temperature is increased further to temperatures ranging from 500° C. to 1000° C. (depending on the specific pitch), the foamed pitch becomes coked (or rigid), thus producing a solid foam derived from pitch. Hence, the foaming has occurred before the release of pressure and, therefore, this process is very different from previous art.

Samples from the foam were machined into specimens for measuring the thermal conductivity. The bulk thermal conductivity ranged from 58 W/m·K to 187 W/m·K. The average density of the samples was 0.53 g/cm$^3$. When weight is taken into account, the specific thermal conductivity of the pitch derived from foam is over 4 times greater than that of copper. Further derivations can be utilized to estimate the thermal conductivity of the struts themselves to be nearly 700 W/m·K. This is comparable to high thermal conductivity carbon fibers produced from this same ARA24 mesophase pitch.

X-ray analysis of the foam was performed to determine the crystalline structure of the material. From this data, the graphene layer spacing ($d_{002}$) was determined to be 0.336 nm. The coherence length ($L_{a,1010}$) was determined to be 203.3 nm and the stacking height was determined to be 442.3 nm.

The validity of the flash diffusivity method and whether the open porosity would permit penetration of the heat pulse into the sample had to be established. Deep penetration of the pulse in samples typically causes a change in the characteristic heat pulse on the back face of the sample. Thus, errors in the reported diffusivity can be as high as 20%. However, the rather large struts and small openings of the foam limits the depth of penetration to about one to two pore diameters (250–500 micrometers), or less than 2% penetration. Therefore, it was believed that this technique would yield a fairly accurate value for the thermal conductivity. This was confirmed by testing samples with both the flash diffusivity method and the thermal gradient method. The measured conductivities varied by less than 5%, verifying the flash method as a viable method to measure these foams. If the pore structure changes significantly, the flash method will likely yield inaccurate results. The bulk thermal conductivity of the graphitized ARA24 foam, graphitized at 4° C./min, was in the range of approximately 146 to 187 W/m·K. This is remarkable for a material with such a low density of approximately 0.56 g/cm$^3$. This calculates as a bulk specific thermal conductivity in the range of approximately 256 to 334 W/m·K/g/cm$^3$. The foam exhibits thermal conductivies comparable to the in-plane thermal conductivity of some other thermal management materials and significantly higher than in the out-of-plane directions of the other thermal management materials. Although several of the other thermal management materials have higher in-plane thermal conductivities, their densities are much greater than the foam, i.e., the specific thermal conductivity of the foam is significantly greater than all the available thermal management panels. In fact, the specific thermal conductivity is more than seven times greater than copper (45 W/m·K), the preferred material for heat sinks. It is clear that for thermal management, where weight is a concern or where un-steady state conditions occur often, the graphitic foam is superior to most other available materials. The advantage of isotropic thermal and mechanical properties should allow for novel designs that are more flexible and more efficient.

Another property that affects the overall thermal performance of the carbon foam is the specific surface area (SSA), calculated by:

$$SSA\ [m^2/m^3] = \text{Total Pore Area}\ [m^2/g] \times \text{Estimated Density}\ [g/cm^3] \times 1{,}000{,}000\ [cm^3/m^3]$$

Smaller specific surface areas indicate a lower foam porosity which reduces the effect of the natural convective heat transfer mode (laminar flow) and allows the more efficient conductive heat transfer mode to dominate thermal performance. Larger SSA's enhance evaporative cooling via increased surface area to volume ratio and increasing the contact area between the evaporative fluid and the foam material. SSA is also be an indicator of the foam's response to forced convective heat transfer (turbulent flow) via fluid passing through the media by increasing the surface area used for heat transfer. The SSA varies in the range of approximately 19,440 m$^2$/m$^3$ to approximately 43,836,000 m$^2$/m$^3$.

Lattice parameters were determined from the indexed diffraction peak positions. The X-ray method for crystallite size determination has been extensively reviewed elsewhere. The 002 and 100 diffraction peak breadths were analyzed using the Scherrer equation to determine the crystallite dimensions in the a- and c- directions.

$$t = \frac{0.9\lambda}{B\cos(2\theta)}$$

where t is the crystallite size, λ is the X-ray wavelength, B is the breadth of the diffraction peak [full width half maximum (FWHM) minus the instrumental breadth], and 2θ is the diffraction angle. The 002 peak (which is characteristic of interlayer spacing), was very narrow and asymmetric, indicative of highly ordered graphite. The interlayer spacing calculated with the Scherrer method in the range of approximately 0.3354 nm to 0.3362 nm. The crystallite size in the c-direction was calculated from these data to be at least approximately 82.4 nm, and the 100 peak (or 1010 in hexagonal nomenclature) was used to calculate the crystallite size in the a-direction of at least approximately 21.5 nm. These crystallite sizes are larger than typical high thermal conductivity carbon fibers and therefore, the foam ligaments should perform similarly to high order pyrolytic carbon and high thermal conductivity carbon fibers such as K1100 and vapor grown carbon fibers (VGCF).

The "doublet" at the 100 and 101 peaks is characterized by a relative peak split factor (RPSF) parameter, or narrowness, calculated using the peak angles and the full width half maximums (FWHM). The equation is:

$$RPSF = \frac{\left(\frac{FWHM_{101}}{2} + \frac{FWHM_{100}}{2}\right)}{2\theta_{100} - 2\theta_{101}}$$

A smaller RPSF indicates closer peaks at 100 and 101 and favorable lattice conditions for thermal conductivity and structural integrity. The data shows a RPSF of at most approximately 0.298, but a least in the range of 0.298 to 0.470.

The compression strength of the samples was measured to be 3.4 Mpa and the compression modulus was measured to be 73.4 Mpa. The foam sample was easily machined and could be handled readily without fear of damage, indicating good strength.

It is important to note that when this pitch is heated in a similar manner, but only under atmospheric pressure, the pitch foams dramatically more than when under pressure. In fact, the resulting foam is so fragile that it could not even be handled to perform tests.

It is obvious that other materials, such as metals, ceramics, plastics, or fiber-reinforced plastics could be bonded to the surface of the foam of this invention to produce a foam core composite material with acceptable properties. It is also obvious that ceramics, or glass, or other materials could be impregnated into the foam for densification.

Based on the data taken to date from the carbon foam material, several observations can be made and the important features of the invention are:

1. Pitch-based carbon foam can be produced without an oxidative stabilization step, thus saving time and costs.
2. High graphitic alignment in the struts of the foam is achieved upon graphitization to 2500° C., and thus high thermal conductivity and stiffness will be exhibited by the foam, making them suitable as a core material for thermal applications.
3. High compressive strengths should be achieved with mesophase pitch-based carbon foams, making them suitable as a core material for structural applications.
4. Foam core composites can be fabricated at the same time as the foam is generated, thus saving time and costs.
5. Rigid monolithic preforms can be made with significant open porosity suitable for densification by the Chemical Vapor Infiltration method of ceramic and carbon infiltrants.
6. Rigid monolithic preforms can be made with significant open porosity suitable for activation, producing a monolithic activated carbon.
7. It is obvious that by varying the pressure applied, the size of the bubbles formed during the foaming will change and, thus, the density, strength, and other properties can be affected.

The process involves the fabrication of a graphitic foam from a mesophase or isotropic pitch which can be synthetic, petroleum, or coal-tar based. A blend of these pitches can also be employed. The simplified process utilizes a high pressure high temperature furnace and thereby, does not require and oxidative stabilization step. The foam has a relatively uniform distribution of pore sizes (~100 microns), very little closed porosity, and density of approximately 0.53 g/cm$^3$. The mesophase pitch is stretched along the struts of the foam structure and thereby produces a highly aligned graphitic structure in the struts. These struts will exhibit thermal conductivities and stiffness similar to the very expensive high performance carbon fibers (such as P-120 and K1100). Thus, the foam will exhibit high stiffness and thermal conductivity at a very low density (~0.5 g/cc). This foam can be formed in place as a core material for high temperature sandwich panels for both thermal and structural applications, thus reducing fabrication time. By utilizing an isotropic pitch, the resulting foam can be easily activated to produce a high surface area activated carbon. The activated carbon foam will not experience the problems associated with granules such as attrition, channeling, and large pressure drops.

What is claimed is:

1. A humidifier comprising:
   a first pitch-derived graphite carbon foam element,
   a means for heating said first foam element,
   a means for wetting said first foam element,
   a means for increasing the humidity ratio of an airstream passed through said first foam element, and
   a means for preheating said airstream prior to entering said first foam element wherein said means for preheating comprises an air-to-air heat exchanger.

2. The humidifier of claim 1 wherein said heat exchanger comprises a second carbon foam element.

3. The humidifier of claim 2 wherein said second carbon foam element has a bulk thermal conductivity in the range of approximately 58 to 187 W/m·K.

4. The humidifier of claim 1 wherein the heat source for said heat exchanger is fuel cell exhaust.

5. The humidifier of claim 4 wherein said fuel cell exhaust is condensed inside said heat exchanger thereby generating at least a portion of said means for wetting said first foam element.

* * * * *